United States Patent
Ni et al.

(10) Patent No.: US 9,904,740 B1
(45) Date of Patent: Feb. 27, 2018

(54) NETWORK OF NETWORKS RECONSTRUCTION EMPLOYING COMPRESSED SENSING

(71) Applicant: HRL Laboratories, LLC, Malibu, CA (US)

(72) Inventors: Kang-Yu Ni, Calabasas, CA (US); Tsai-Ching Lu, Wynnewood, PA (US)

(73) Assignee: HRL Laboratories, LLC, Malibu, CA (US)

(*) Notice: Subject to any disclaimer, the term of this patent is extended or adjusted under 35 U.S.C. 154(b) by 714 days.

(21) Appl. No.: 14/472,351

(22) Filed: Aug. 28, 2014

Related U.S. Application Data

(60) Provisional application No. 61/872,583, filed on Aug. 30, 2013.

(51) Int. Cl.
*G06F 17/30* (2006.01)

(52) U.S. Cl.
CPC .............. *G06F 17/30958* (2013.01)

(58) Field of Classification Search
CPC ......... G06F 17/00; G06F 17/17; G06F 17/30; G06F 17/30958

USPC ........................................................ 702/196
See application file for complete search history.

(56) References Cited

U.S. PATENT DOCUMENTS

| | | | |
|---|---|---|---|
| 7,289,049 B1 | 10/2007 | Fudge et al. | |
| 2010/0306158 A1* | 12/2010 | Andersen | G06F 17/10 706/52 |
| 2013/0121550 A1* | 5/2013 | Chang | G06T 11/003 382/130 |

OTHER PUBLICATIONS

Siyari et al. Network Reconstruction under Compressive Sensing, 2012, ASE, pp. 1-15.*

(Continued)

*Primary Examiner* — Mohamed Charioui
(74) *Attorney, Agent, or Firm* — North Shore Associates

(57) ABSTRACT

Network of networks (NoN) structure reconstruction employs compressed sensing with multivariate time series data and graph partitioning to reconstruct a node-to-node connection structure of an NoN. The NoN structure reconstruction includes determining an adjacency matrix of the NoN from the multivariate time series data using the compressed sensing. Partitioning a graph representing the determined adjacency matrix into subgraphs provides the reconstruction of the node-to-node connection structure.

20 Claims, 6 Drawing Sheets

(56) References Cited

OTHER PUBLICATIONS

Erdos, P. et al., "On the evolution of random graphs," Publications of the Mathematical Institute of the Hungarian Academy of Sciences, vol. 5, 1960, pp. 17-61.
Erdos, P. et al., "On the evolution of random graphs," Bull. Inst. Internat. Statist., vol. 38, No. 4, 1961, pp. 343-347.
Candes et al., Near Optimal Signal Recovery From Random Projections: Universal Encoding Strategies? IEEE Trans. on Information Theory, vol. 52, No. 12, 2006, pp. 5406-5425.
Donaho et al., "Compressed Sensing," IEEE Trans. on Information Theory, vol. 52, No. 4, 2006, pp. 1289-1306.
Baraniuk, R., "Compressive Sensing," IEEE Signal Processing Magazine, Jul. 2007, pp. 118-120 and 124.
Siyari et al., "Network Reconstruction under Compressive Sensing," ASE Human Journal, vol. 1, No. 3, pp. 130-143, 2012.
Su et al., "Detecting hidden nodes in complex networks from time series," Physical Review E, vol. 85, 2012, pp. 065201-1-065201-4.
Firooz et al., "Network Tomography via Compressed Sensing," GLOBECOM 2010, Dec. 2010, pp. 1-5.
Wakin et al., "A Nonuniform Sampler for Wideband Spectrally-Sparse Environments," IEEE J. Emerging and Selected Topics in Circuits and Systems, vol. 2, No. 3, Sep. 2012, pp. 516-529.

\* cited by examiner

US 9,904,740 B1

NETWORK OF NETWORKS RECONSTRUCTION EMPLOYING COMPRESSED SENSING

CROSS-REFERENCE TO RELATED APPLICATIONS

N/A

STATEMENT REGARDING FEDERALLY SPONSORED RESEARCH OR DEVELOPMENT

N/A

BACKGROUND

1. Technical Field

The invention relates to networks and networking. In particular, the invention relates to a connection structure within networks having a plurality of nodes.

2. Description of Related Art

Broadly defined, a network is an interconnected group or system of entities. In particular, the entities of the group or system are interconnected to share or distribute data or more generally information among the entities that are members of the network. Networks are found in a wide variety of fields, disciplines and situations including, but not limited to, biology, sociology and business (e.g., neural networks, social networks, business networks, etc.), electrical systems (e.g., power distribution grids), electronic systems (e.g., circuit boards, integrated circuits, radio and television networks, etc.) and computer systems (e.g., local area networks, computer-based social networks, the Internet, etc.).

BRIEF SUMMARY

In some embodiments, method of network of networks (NoN) structure reconstruction is provided. The method of NoN structure reconstruction comprises determining an adjacency matrix A of an NoN from multivariate time series data using compressed sensing. The multivariate time series data comprises data produced at nodes of the NoN. The method of NoN structure reconstruction further comprises partitioning a graph representing the determined adjacency matrix A into subgraphs, the subgraphs characterizing node-to-node connections within and between a plurality of networks of the NoN. The subgraphs of the partitioned graph provides a reconstruction of a node-to-node connection structure of the NoN In some embodiments, a network connection reconstruction system is provided. The network connection reconstruction system comprises a processor, a memory and a computer program stored in memory. The computer program includes instructions that, when executed by the processor, provide reconstruction of a connection structure between nodes of the NoN. The reconstruction instructions include determining an adjacency matrix of the NoN from multivariate time series data using compressed sensing, and partitioning a graph representing the determined adjacency matrix into a first subgraph and a second subgraph. The multivariate time series data is measured at nodes of the NoN and the first and second subgraphs of the partitioned graph provide a reconstruction of node-to-node connections within the NoN.

In some embodiments, a non-transitory computer readable medium is provided. The non-transitory computer readable medium includes instructions that, when executed by a processor, implement reconstruction of a connection structure between nodes of a NoN. The implemented connection structure reconstruction comprises determining an adjacency matrix of the NoN from multivariate time series data using compressed sensing, where the multivariate time series data comprises data produced at nodes of the NoN. The implemented connection structure reconstruction further comprises partitioning a graph representing the determined adjacency matrix into subgraphs characterizing connections between nodes of networks of the NoN. The partitioned graph provides a reconstruction of edge connections between nodes of the NoN.

BRIEF DESCRIPTION OF THE DRAWINGS

Various features of embodiments in accordance with the principles described herein may be more readily understood with reference to the following detailed description taken in conjunction with the accompanying drawings, where like reference numerals designate like structural elements, and in which.

Figure 1:
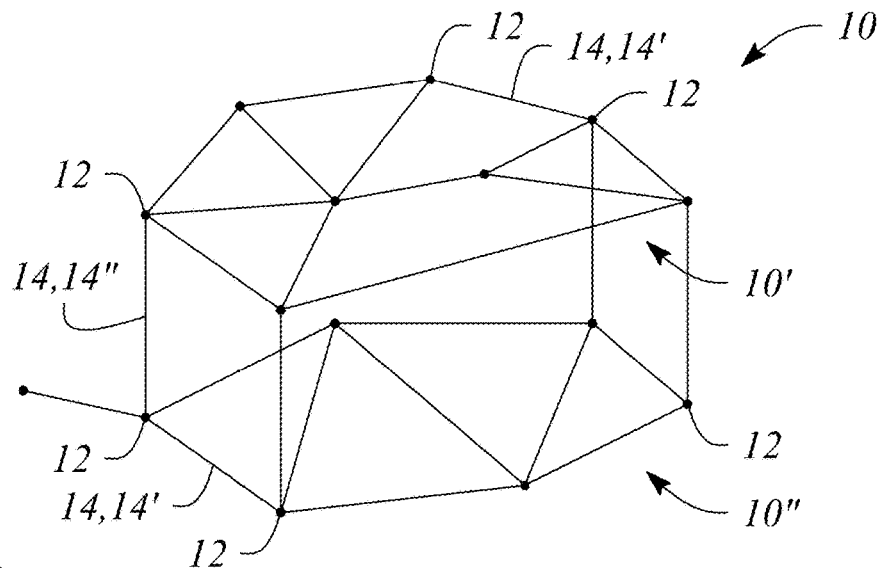
FIG. 1 illustrates a schematic diagram of a network, according to an embodiment consistent with the principles of the present invention.

Certain examples and embodiments have other features that are one of in addition to and in lieu of the features illustrated in the above-referenced figures. These and other features are detailed below with reference to the above-referenced figures.

DETAILED DESCRIPTION

Embodiments consistent with the principles of the present invention provide reconstruction of a network of networks (NoN). In particular, embodiments of the present invention discover or reconstruct a structure of a network from a multivariate time series of interactions between nodes of the network. The discovered structure includes node-to-node connections in a network, where the connections are a priori unknown. In various embodiments, the network structure is reconstructed based on compressed sensing. Further, graph partitioning is employed to facilitate structure reconstruction of the NoN, according to various embodiments. Among other things, embodiments of the present invention enable characterization of a connection structure of a complex network based entirely on the multivariate time series and information regarding underlying node dynamics without information regarding node-to-node connections of the complex network.

A 'network' is defined herein as a plurality of vertices or nodes interconnected to one another by edges or connections. In general terms, the nodes represent physical elements of the network at which information is one or more of stored, processed, created and utilized. The connections represent information pathways between the nodes, according to various embodiments. For example, the network may be a computer network or a data network in which the nodes are computers, processors or related computing devices. The connections or edges of a computer or data network may be communication channels between the nodes, for example. An example of a computer or data computer network is the Internet or World Wide Web. Individual computers (e.g., application and storage servers, personal computers, printers, etc.) connected to the Internet are the nodes while a communication channel (e.g., Ethernet, WiFi, etc.) acts as the connection between the individual computer and the Internet, for example. Other examples of networks include, but are not limited to, biological and artificial neural networks, social networks (e.g., Facebook®, Twitter®, Instagram®, etc.), business networks, telecommunication networks, television networks, wireless networks, supply chains, and electrical distribution networks (e.g., the electrical power grid or so-called 'smart' grid). Networks may also include mixed or aggregated networks. For example, an example of a network may be the electrical power grid comprising a plurality of networked power stations, substations, etc., along with a network of interconnected computers that control the electrical power grid. The computers may be networked to each other and to the electrical power grid, for example. Facebook® is a registered trademark of Facebook, Inc., Menlo Park, Calif.; Twitter® is a registered trademark of Twitter, Inc., San Francisco, Calif.; and Instagram® is a registered trademark of Instagram, LLC, Menlo Park, Calif.

According to some embodiments, the network may be modeled as a random graph such as, but not limited to, an Erdos-Renyi random graph in which a graph having N nodes (i.e., network nodes) and M edges (i.e., network connections) is either selected at random from a collection of all graphs having N nodes and M edges or the graph is constructed by connecting the N nodes randomly with the M edges. The Erdos-Renyi random graph is described by Erdös, Paul and A. Rènyi, "On the evolution of random graphs," *Publications of the Mathematical Institute of the Hungarian Academy of Sciences*, Vol. 5, 1960, pp. 17-61, incorporated by reference herein.

Herein, a 'network of networks' also referred to as a 'multiplexed network' is defined as a plurality of interconnected networks. In particular, a network of networks comprises a first network and a second network along with connections between the first and second network. The Internet is often referred to as a network of networks in that the Internet generally comprises a plurality of computer networks interconnected to one another by a communications backbone or grid. Connections between the first network and the second network of the network of networks, by definition herein, connect a node in the first network to a node in the second network within the network of networks.

FIG. 1 illustrates a schematic of a network 10, according to an example consistent with the principles of the present invention. In particular, the network 10 is a network of networks comprising a first network 10' and a second network 10". The network 10 includes a plurality of nodes 12 interconnected by edges or connections 14 between various node pairs, as illustrated. Some of the connections 14' interconnect nodes 12 within a particular network (e.g., within the first network 10' or within the second network 10"), while other connections 14" interconnect nodes 12 in different networks, i.e., the connection 14" is between a node 12 of the first network 10' and a node 12 of the second networks 10".

Herein, a network may be represented by a finite graph G in which vertices represent nodes of the network and edges represent node-to-node connections of the network. By definition herein, an 'adjacency matrix' is a matrix representation of the node-to-node connections in the network (i.e., edges of the graph G), where an element $\alpha_{ij}$ of an adjacency matrix A represents a connection between an i-th node and a j-th node of the network. The adjacency matrix A is a square, symmetric matrix (e.g., an N×N matrix). Herein by definition, a 'graph Laplacian matrix,' or simply a 'Laplacian matrix,' of a network (i.e., explicitly including a network of networks), is a matrix representation of the graph G of the network. In particular, herein the Laplacian matrix L for the graph G is defined by equation (1) as $$L = \nabla - A \quad (1)$$

where $\nabla$ is a degree matrix and A is an adjacency matrix of the graph G. The degree matrix $\nabla$ is defined as a diagonal matrix where a diagonal element $d_{ii}$, is equal to a degree (i.e., a number of connections) of an i-th node of the network represented by the graph G.

Herein, 'compressed sensing' is defined as a technique, originally developed for signal processing, to reconstruct a characteristic (e.g., a signal) of a system by finding solutions to an underdetermined linear system. In particular, compressed sensing employs a series of sampling measurements of the system to reconstruct the system characteristic. In some embodiments, the sampling measurements or sampled data (e.g., time series) are sampled at a sub-Nyquist sampling rate. Further, in some embodiments, the sampling may be random or substantially random with respect to time (i.e., random sampling), while the sampling may be uniform or substantially uniform in time (i.e., uniform sampling), in other embodiments. Further definition of compressed sensing, as employed herein, may be found in Candes et al., "Near Optimal Signal Recovery from Random Projection: Universal Encoding Strategies?" *IEEE Trans. on Information Theory*, Vol. 52, No. 12, 2006, pp. 5406-5425, and Donaho, "Compressed Sensing," *IEEE Trans. on Informa-*

*tion Theory*, Vol. 52, No. 4, 2006, pp. 1289-1306, both of which are herein incorporated by reference in their entirety. As used herein, the 'system' is a network and the underdetermined linear system is a relationship between a set of data (e.g., a multivariate time series) associated with nodes of the network and dynamics of the nodes. In some embodiments, sampling measurements or a set of data may not be available for one or more nodes in the network.

Embodiments consistent with the principles described herein may be implemented using a variety of devices and circuits including, but not limited to, integrated circuits (ICs), very large scale integrated (VLSI) circuits, application specific integrated circuits (ASIC), field programmable gate arrays (FPGAs) and the like, firmware, software, or a combination of two or more of the above. For example, elements or 'blocks' of an implementation consistent with the principles described herein may all be implemented as circuit elements within an ASIC or a VLSI circuit. Implementations that employ an ASIC or a VLSI circuit are examples of hardware-based circuit implementation, for example. In another example, the entire apparatus may be implemented as software using a computer programming language (e.g., C/C++) or software-based modeling environment (e.g., Matlab®, MathWorks, Inc., Natick, Mass.). Implementation of the entire apparatus as software is an example of a purely software implementation. In yet another example, some of the blocks may be implemented using actual circuitry (e.g., as an IC or an ASIC) while other blocks may be implemented in software or firmware.

Herein, a 'non-transitory computer readable medium' is defined as substantially any data storage medium that provides non-transitory storage of information that may be read or otherwise utilized by a computer. For example, computer readable memory including, but not limited to, random access memory (RAM), read-only memory (ROM), programmable or erasable ROM and flash memory (e.g., a thumb drive) are each a non-transitory computer readable medium, by definition herein. Other examples of non-transitory computer readable medium include, but are not limited to, various types of magnetic disks and disk drives (e.g., a hard disk drive, a floppy disk drive, a floppy diskette, etc.), and various optical discs and disc drives (e.g., CD, CD-R, CD-RW, DVD, etc.), by definition herein. In addition, network attached storage, so-called 'cloud' storage (e.g., remote data storage accessible via the Internet), or various other types of computer readable medium used by modern computing systems may be non-transitory computer readable medium, by definition herein.

Further, as used herein, the article 'a' is intended to have its ordinary meaning in the patent arts, namely 'one or more'. For example, 'a node' means one or more nodes and as such, 'the node' means 'the node(s)' herein. Also, any reference herein to 'top', 'bottom', 'upper', 'lower', 'up', 'down', 'front', back', 'left', 'right', 'first' or 'second' is not intended to be a limitation herein. Herein, the term 'about' when applied to a value generally means within the tolerance range of the equipment used to produce the value, or in some examples, means plus or minus 20%, or plus or minus 10%, or plus or minus 5%, or plus or minus 1%, unless otherwise expressly specified. Further, the term 'substantially' as used herein means a majority, or almost all, or all, or an amount within a range of about 51% to about 100%, for example. Moreover, examples and embodiments herein are intended to be illustrative only and are presented for discussion purposes and not by way of limitation.

In some embodiments of the present invention, a method of network of networks (NoN) structure reconstruction is provided. The method of NoN structure reconstruction 'finds' or discovers (i.e., reconstructs) a structure of node-to-node connections within a NoN having a plurality of nodes. In particular, the method of NoN structure reconstruction employs multivariate time series data from the NoN to 'discover' connections between nodes within the NoN. The discovered node-to-node connections are both within separate networks of the NoN and between the separate networks (e.g., first and second networks of the NoN). Moreover, the connection structure of the NoN may be substantially unknown prior to employing the method of NoN structure reconstruction, according to various embodiments. That is, the nodes of the NoN are known, while connections between the nodes in the NoN are generally not known.

According to various embodiments, the method of NoN structure reconstruction generates a graph or map of the node-to-node connections within the NoN. In addition, the method of NoN structure reconstruction also groups or associates sets of connections with various networks within the NoN. As such, the method of NoN structure reconstruction produces a graph having a plurality of subgraphs that denote the connections, both intra-network connections and inter-network connections, of the NoN, according to various embodiments.

According to various embodiments, the NoN for which the node-to-node connections are reconstructed comprises N nodes, where 'N' is an integer greater than one, according to some examples. Further, the NoN may include a first network and a second network, where the first network includes a subset of the N nodes in the NoN and the second network includes another subset of the N nodes. For example, the first network may include a first M nodes of the N nodes, i.e., where M is a positive integer that is less than N. Hence, the first network may include nodes labeled from '1' to 'M' (i.e., nodes: 1, 2, 3, . . . M; where M<N). The second network may include the nodes not included in the first network such that the second network includes nodes labeled from 'M+1' to 'N' (i.e., nodes: M+1, M+2, M+3, . . . , N), for example.

According to some examples, the node-to-node connections of the NoN may be undirected connections. In other examples, the node-to-node connections may be directed connections. According to various examples, the node-to-node connections may represent one or both of weighted and unweighted connections.

Further, node-to-node connections within the NoN are sparse and static, according to various embodiments. For example, on average, any particular node (e.g., an i-th node) of the NoN may be connected to fewer than about forty percent (40%) of the other nodes of the NoN (i.e., the nodes of the NoN have a connection probability of less than about 40%). In other examples, the NoN connection probability may be less than about thirty percent (30%), or less than about twenty percent (20%), or less than about ten percent (10%). In addition, it is assumed herein that connections between nodes do not change (i.e., are static).

Figure 2:
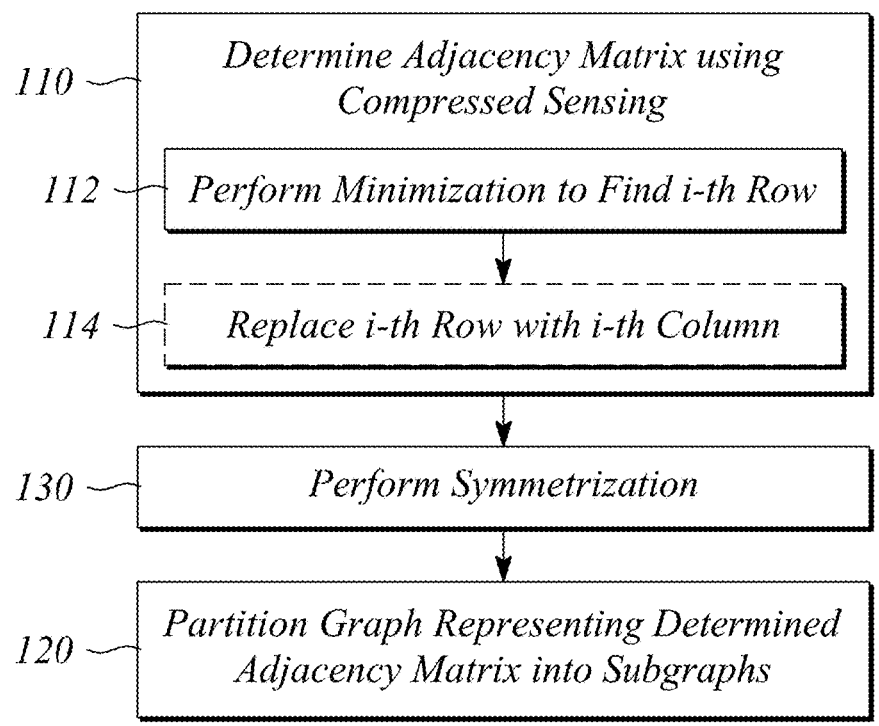
FIG. 2 illustrates a flow chart of a method of network of networks (NoN) structure reconstruction, according to an embodiment consistent with the principles of the present invention.

FIG. 2 illustrates a flow chart of a method 100 of network of networks (NoN) structure reconstruction, according to an embodiment consistent with the principles of the present invention. As illustrated in FIG. 2, the method 100 of NoN structure reconstruction comprises determining 110 an adjacency matrix of the NoN using compressed sensing. In particular, the adjacency matrix is determined 110 from multivariate time series data using compressed sensing, according to various embodiments. The determined 110 adjacency matrix is an estimate or an approximation of a true or actual adjacency matrix for the NoN. As an estimate, the determined 110 adjacency matrix may be arbitrarily close to the actual adjacency matrix, according to some examples. For example, when sufficient multivariate time series data is available a difference between the determined 110 adjacency matrix and the actual adjacency matrix for the NoN may become arbitrarily small.

Herein, the adjacency matrix may be denoted by 'A' and is an N×N matrix having N rows and N columns, where N is a integer equal to a number of nodes in the NoN, by definition herein (i.e., N>1). An i-th row of the adjacency matrix A describes or defines connections between an i-th node of the NoN and all other nodes in the NoN. In some examples, entries in the adjacency matrix A may merely indicate whether or not a connection exists, while in other examples, the entries may further include information about a strength or weighting of the connections. For example, a j-th entry in the i-th row of the adjacency matrix A may be '1' if there is a node-to-node connection between the i-th node and a j-th node and otherwise, is '0'. In another example, the j-th entry may have a positive value greater than one to indicate both a connection and a strength of the connection between the i-th node and the j-th node. The strength indicated by the value of the j-th entry in the i-th row of the adjacency matrix A may be a normalized or relative strength, for example. An entry or equivalently a relative strength of either zero or less than zero (i.e., a negative value) may indicate a lack of a connection between the i-th node and the j-th node, for example.

According to various embodiments, the multivariate time series data used in the compressed sensing to determine 110 the adjacency matrix comprises data produced by or observed (e.g., sampled) at nodes of the NoN. In particular, the multivariate time series data comprises data observed at a plurality of nodes of the NoN. According to some examples, the plurality of nodes at which data is produced or observed may be fewer than the number of nodes in the NoN. In other examples, the multivariate time series data is observed data from substantially all of the nodes (e.g., all Nnodes). The nodes from which multivariate time series data is available are referred to as 'observable' nodes. As such, the multivariate time series data may also be characterized as a multivariate time series 'of the observable nodes' or simply 'of observables' within the NoN, according to some examples.

Further, the multivariate time series data includes data produced or observed at the observable nodes as a function of time. In particular, for each observable node, the multivariate time series data comprises a series or sequence of data corresponding to a plurality of data samples observed at different times or during different time intervals. For example, the multivariate time series data may represent data observed at regular times between a start time and a stop time. In other examples, the multivariate time series data may be observed at irregular (e.g., random) time intervals between the start time and stop time. In some embodiments, the multivariate time series data is measured at the observable nodes. The measurements used to produce the multivariate time series data may be spaced in time to provide individual data samples, for example.

According to various embodiments, the multivariate time series data is indicative of activity (e.g., information flow) between the nodes that occurs through the node-to-node connections of the NoN. In particular, the multivariate time series data at an i-th node of the NoN may be modeled as a weighted sum of 'dynamics' of various nodes connected to the i-th node at each time t (i.e., time interval) represented by the multivariate time series. The dynamics of the various nodes may be represented by a dynamics matrix associated with an i-th node in which a t-th row of the dynamics matrix defines a contribution to the multivariate time series for the i-th node at a time t in the event that there were connections between all other nodes and the i-th node.

In representing the dynamics associated with an i-th node as a dynamics matrix $D_i$, the weighted sum may be given by equation (2) as $$y_i = D_i \alpha_i^T \quad (2)$$

where $y_i$ is vector representing multivariate time series data for the i-th node and a vector $\alpha_i^T$ is a vector transpose of an i-th row vector $\alpha_i$ of the adjacency matrix A for the NoN (i.e., $(\bullet)^T$ is a transpose operator, herein). If the multivariate time series data $y_i$ includes a total of T data points or observations, then the multivariate time series data $y_i$ is a T×1 column vector in equation (2), while the vector $\alpha_i^T$ is an N×1 column vector when the NoN includes N nodes. As such, the dynamics matrix $D_i$ in equation (2) has dimensions T×N. Moreover, a product of a t-th row of the dynamics matrix $D_i$ and the vector transpose $\alpha_i^T$ of the i-th row vector $\alpha_i$ representing the i-th row of the adjacency matrix A is equal to an observation or data taken at the i-th node at time t as provided by the multivariate time series $y_i$, according to equation (2). As such, a j-th entry in a t-th row of the dynamics matrix $D_i$ is a contribution to the multivariate time series $y_i$ if a connection were to be present between a j-th node and an i-th node of the NoN, by definition herein. Note that, according to various embodiments, a rank($D_i$) is assumed to be greater than a predetermined value to ensure that the dynamics represented by the dynamics matrix $D_i$ is diverse enough.

In some embodiments, determining 110 the adjacency matrix A of the NoN using compressed sensing comprises finding an i-th row vector $\alpha_i$ of the adjacency matrix A corresponding to an i-th node of the NoN by performing 112 a minimization given by equation (3) as $$\min_{\alpha_i}\left(\|y_i - D_i\alpha_i^T\|_2^2 + \lambda\|\alpha_i^T\|_1\right) \quad (3)$$

where $\lambda$ is a tuning parameter having a predetermined scalar value that is greater than one (i.e., $\lambda>0$), $(\bullet)^T$ is a transpose operator, and $\|\bullet\|_1$ and $\|\bullet\|_2$ are a 1-norm of $L_1$-norm and a 2-norm or $L_2$-norm, respectively. A predetermined scalar value of the tuning parameter $\lambda$ may be chosen to facilitate the minimization, for example. For example, a larger tuning parameter $\lambda$ value may enforce a sparsity constraint to a greater extent and, in turn, may relax a data fidelity term compared to a smaller value of the tuning parameter $\lambda$. In particular, when the time series data is noisy, relaxing the data fidelity term may be advantageous. According to some examples, the tuning parameter $\lambda$ may be chosen to be about one thousand (1000). Norms other than the 1-norm and 2-norm used as indicated in equation (3) may be employed, according to other embodiments. Note that, if the data is substantially noise-free, equation (3) may be alternatively solved using $$\min_{\alpha_i}\|\alpha_i^T\|_1$$

such that $y_i = D_i\alpha_i^T$.

According to various embodiments, the minimization given by equation (3) determines 110 an i-th row $\alpha_i$ of the adjacency matrix A. As such, using compressed sensing to determine 110 the adjacency matrix A may comprise performing 112 a minimization given by equation (3) for each of the nodes of the NoN. In particular, the minimization given by equation (3) may be performed 112 to find each row $\alpha_i$, of the adjacency matrix A (i.e., to find $\alpha_i$ for i=1, 2, . . . N), according to various embodiments. Once the minimization given by equation (3) is performed 112 for each of the N nodes and all of the rows have been determined 110, an estimated or 'determined' adjacency matrix A is produced.

According to some embodiments, determining 110 the adjacency matrix A may further comprise replacing 114 an i-th row of the determined adjacency matrix A with an i-th column of the determined adjacency matrix A. Replacing 114 an i-th row with an i-th column may be performed when a residual of the performed 112 minimization with respect to the i-th row is greater than a predetermined value. In particular, when the residual of the minimization for the i-th row exceeds the predetermined value, each entry in the i-th row is replaced 114 with a value of a corresponding entry in the i-th column. Replacing 114 an i-th row with an i-th column may reduce a difference between the determined adjacency matrix A and the actual or true adjacency matrix of the NoN, according to some examples. However, replacing 114 an i-th row with an i-th column may be optional (i.e., may depend on whether the residual for the i-th row is greater than the predetermined value), and therefore, replacing 114 an i-th row with an i-th column is illustrated by a dashed box in FIG. 2.

As illustrated in FIG. 2, the method 100 of NoN structure reconstruction further comprises partitioning 120 a graph representing the determined adjacency matrix (i.e., matrix A) into subgraphs. According to various embodiments, the subgraphs characterize node-to-node connections within and between a plurality of networks (e.g., the first and second networks) of the NoN. Further, the subgraphs of the partitioned 120 graph provide a reconstruction of a node-to-node connection structure of the NoN. According to some embodiments, partitioning 120 a graph representing the determined adjacency matrix A minimizes a ratio of cuts relative to or over a product of sizes of the subgraphs. In some embodiments, partitioning 120 a graph representing the determined adjacency matrix A may employ spectral graph partitioning.

Figure 3:
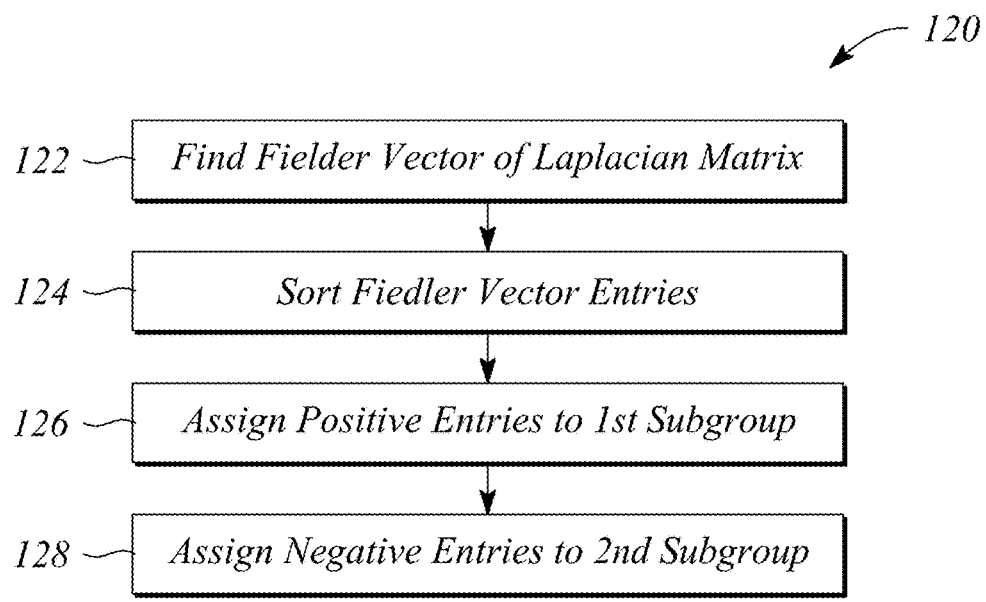
FIG. 3 illustrates a flow chart of partitioning a graph using spectral graph partitioning, according to an embodiment consistent with the principles of the present invention.

FIG. 3 illustrates a flow chart of partitioning 120 a graph representing the determined adjacency matrix A using spectral graph partitioning, according to an embodiment consistent with the principles of the present invention. In particular, as illustrated in FIG. 3, partitioning 120 the graph comprises finding 122 a Fiedler vector of a Laplacian matrix of the graph. Herein, the Fiedler vector is defined as an eigenvector of the Laplacian matrix corresponding to a second smallest eigenvalue of the Laplacian matrix. According to various embodiments, the Fiedler vector has N entries corresponding to the N nodes in the NoN and bisects the graph into two subsets of the N nodes (i.e., two subgraphs) such that the ratio of cuts over the product of sizes of the subgraphs is minimized.

As illustrated, partitioning 120 the graph further comprises sorting 124 entries in the Fiedler vector. In some embodiments, the entries may be sorted 124 in ascending order. In other embodiments, the entries may be sorted 124 in descending order. Partitioning 120 the graph further comprises assigning 126 entries having a positive value to a first subgroup. The first subgroup may represent a first subgraph of the graph, for example. Partitioning 120 the graph illustrated in FIG. 3 further comprises assigning 128 entries having a negative value to a second subgroup. The second subgroup may represent a second subgraph of the graph, for example. According to various embodiments, the first subgraph provides a reconstructed connection structure between nodes of the NoN corresponding to a first network of the NoN and the second subgraph provides a reconstructed connection structure between nodes of the NoN corresponding to a second network of the NoN.

Note that while partitioning 120 illustrated in FIG. 3 comprises bisecting the graph into two subgraphs using the Fiedler vector, partitioning 120 may be generalized to produce a plurality of subgraphs. In particular, partitioning 120 the graph into more than two subgraphs may be provided using spectral clustering, e.g., as opposed to the spectral partitioning described above. For example, spectral clustering may be used to produce k subgraphs of the graph representing the determined adjacency matrix A by performing k means on the first k eigenvectors of the Laplacian.

Referring again to FIG. 2, according to some embodiments, the method 100 of NoN structure reconstruction further comprises performing 130 a symmetrization of the determined adjacency matrix A to produce a symmetric adjacency matrix $A_s$. The symmetric adjacency matrix $A_s$ is then used in place of the originally determined adjacency matrix A, according to various embodiments. According to various embodiments, symmetrization is performed 130 prior to partitioning 120 a graph representing the determined adjacency matrix A. As such, the symmetric adjacency matrix $A_s$ replaces or serves as the determined adjacency matrix A in graph partitioning 120, according to various embodiments.

In some embodiments, performing 130 symmetrization comprises computing the symmetric adjacency matrix $A_s$ according to equation (4)

$$A_s = \frac{A + A^T}{2} \qquad (4)$$

where A is the determined adjacency matrix and $A^T$ represents a matrix transpose of the determined adjacency matrix A. Since true or actual adjacency matrices are symmetric, by definition, the symmetric adjacency matrix $A_s$ resulting from performing 130 symmetrization may be closer to the true adjacency matrix for the NoN than the determined adjacency matrix A, for example. As such, the symmetric adjacency matrix $A_s$ may represent a better reconstruction of the true adjacency matrix when compared to the determined adjacency matrix A, according to some embodiments.

According to some embodiments (not illustrated), the method 100 of NoN structure reconstruction further comprises measuring the multivariate time series data at nodes of the NoN. In particular, the multivariate time series data may be measured at each of the N nodes of the NoN. Measuring the multivariate time series data may be accomplished using a network-appropriate measurement apparatus or method, for example.

The method 100 of NoN structure reconstruction was applied to an example NoN and the results of the structure reconstruction were compared to a known structure of the example NoN. The example NoN to which the method 100 of NoN structure reconstruction was applied had fifty nodes (i.e., N=50) with about 20% of the nodes connected to one another. Further, the example NoN includes a first network with thirty (30) nodes and a second network with twenty (20) nodes. The connections within the example NoN were generated from an Erdos-Renyi random graph, by way of example and not limitation. Interactions between various node pairs of the node-to-node connections in the example NoN were modeled on a prisoner's dilemma game. That is, each node and its respective connected neighboring nodes acted as players in the prisoner's dilemma game. In a playoff matrix of the prisoner's dilemma game, both of a respective player's (i.e., node's) strategy at each of plurality of time intervals and rewards for outcome of the game at each of the time intervals for the various node-to-node pairs were used to generate the multivariate time series data $y_i$ for each of the nodes of the example NoN.

A dynamics matrix $D_i$ for each of the nodes of the example NoN was generated based on the prisoner's dilemma game in which playoff matrices denoted $P_1$ and $P_2$ for nodes in each the first network and the second network of the NoN, respectively, were chosen as given in equations (5) and (6), while a playoff matrix denoted $P_{12}$ for node pairs connected between the first and second networks was chosen according to equation (7).

$$P_1 = \begin{bmatrix} 3 & 0 \\ 4 & 1 \end{bmatrix} \quad (5)$$

$$P_2 = \begin{bmatrix} 4 & 0 \\ 5 & 2 \end{bmatrix} \quad (6)$$

$$P_{12} = \begin{bmatrix} 5 & 0 \\ 6 & 1 \end{bmatrix} \quad (7)$$

Further, in the prisoner's dilemma game used for the example NoN, each player (i.e., node) is assumed to be more likely to cooperate within its group (i.e., nodes within a node's network) and less likely to cooperate outside of its group (i.e., nodes in another, different network). In particular, the player's strategy over time was randomly generated with a seventy percent (70%) chance of cooperation and a thirty percent (30%) chance of defeat when a player (i.e., node) was playing with another player (i.e., node) in the same network. Similarly, a randomly generated twenty percent (20%) chance of cooperation and an eighty percent (80%) chance of defeat was used as the player's strategy for players (i.e., nodes) that were in different networks.

Figure 4A:
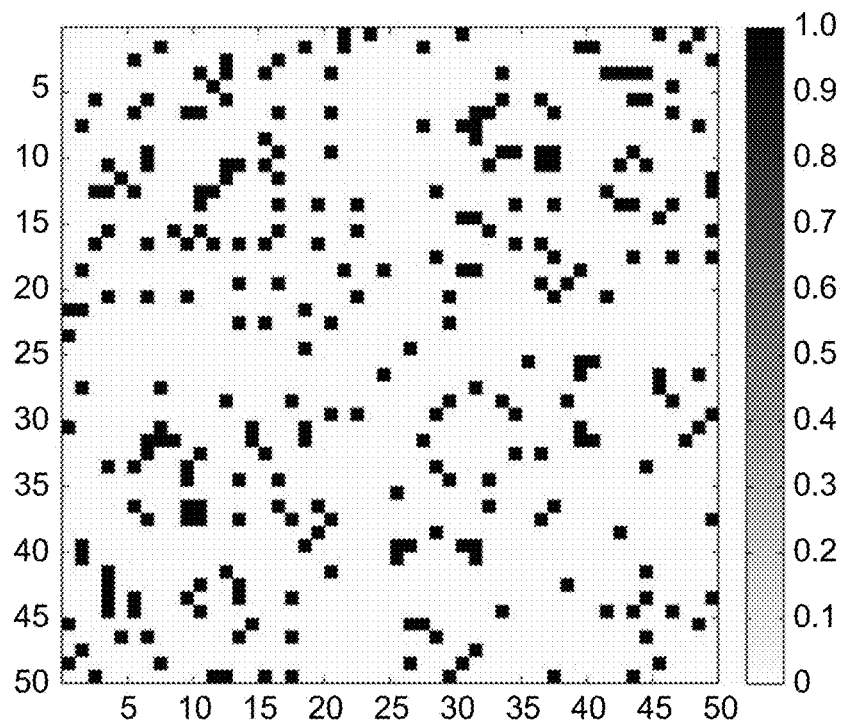
FIG. 4A illustrates a graph representing an adjacency matrix of an example network of networks (NoN), according to an example consistent with the principles of the present invention.

FIG. 4A illustrates a graph representing an adjacency matrix of the example NoN, according to an example consistent with the principles of the present invention. In particular, the graph illustrated in FIG. 4A represents a true or actual adjacency matrix of the example NoN based on the connections generated according to the Erdos-Renyi random graph, as described above. As illustrated in the graph of FIG. 4A, dark squares are at intersections of an i-th row and a j-th column to represent connections between an i-th node and a j-th node within the example NoN. The x-axis and y-axis of the graph in FIG. 4A represent the numbered nodes of the NoN (i.e., i,j=1,..., N). However, the nodes of the example NoN, as numbered in FIG. 4A, are not arranged in a manner that separates the first and second networks into clearly separate subgraphs in the graph illustrated in FIG. 4A (e.g., see FIGS. 6A and 6B, described below). The graph illustrated in FIG. 4A is used as a 'ground truth' comparison with the results of applying the method 100 of NoN structure reconstruction described below.

Figure 4B:
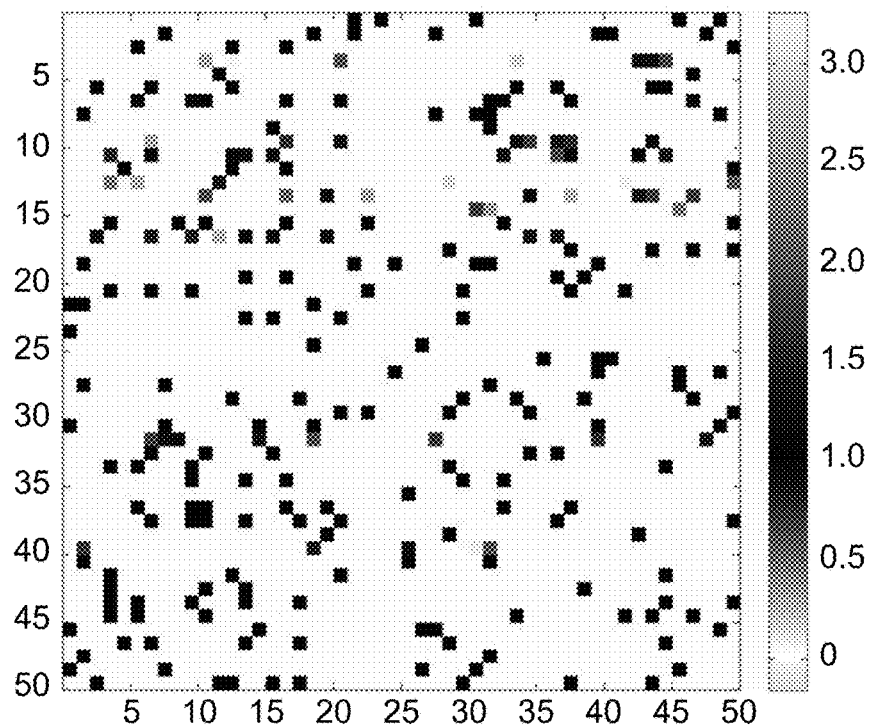
FIG. 4B illustrates a graph representing a determined adjacency matrix corresponding to the example NoN of FIG. 4A, according to an example consistent with the principles of the present invention.

FIG. 4B illustrates a graph representing a determined adjacency matrix corresponding to the example NoN of FIG. 4A, according to an example consistent with the principles of the present invention. In particular, the graph illustrated in FIG. 4B represents a result of determining 110 an adjacency matrix in accordance with the method 100 of NoN structure reconstruction when applied to the example NoN. The determined adjacency matrix A was produced using the prisoner's dilemma game based multivariate time series data $y_i$ and corresponding dynamics matrix $D_i$ for the various nodes in the example NoN. Further, the determined adjacency matrix A of the graph in FIG. 4B was determined 110 using the minimization given by equation (3). As illustrated, connections between nodes represented in the determined adjacency matrix A may have a range of relative strengths as indicated by a relative darkness of squares in the graph (i.e., lighter squares indicate a lower relative strength and darker squares indicate a higher relative strength as provided by a scale to a right of the graph). However, with respect to the example NoN, the illustrated relative strengths do not represent an actual relative strength of the connections, but instead are an artifact of determining 110. Further, the x and y axes in FIG. 4B represent number nodes with the nodes arranged as in FIG. 4A.

Figure 4C:
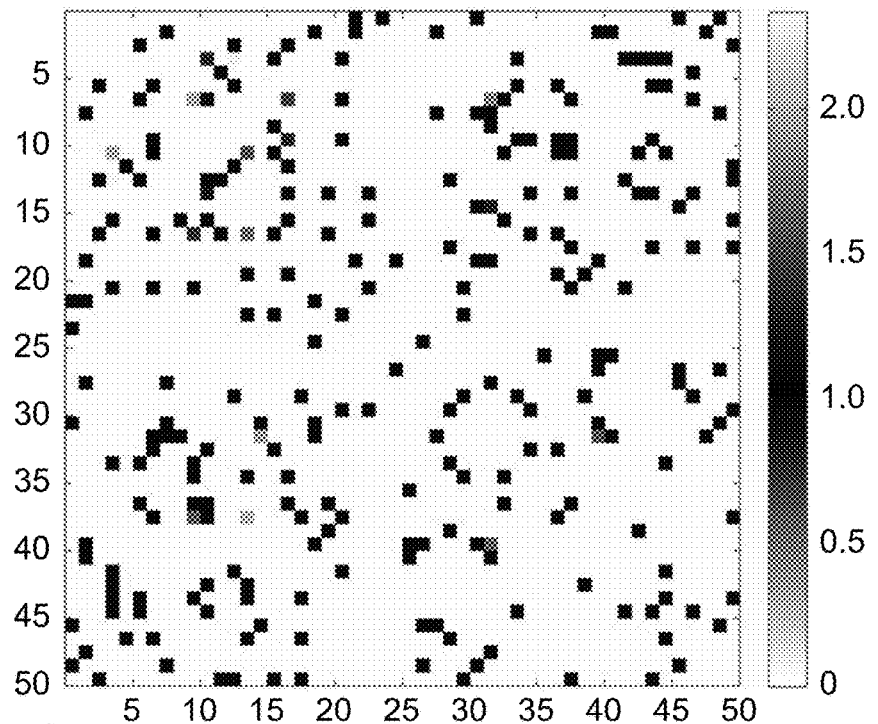
FIG. 4C illustrates a graph representing a symmetric adjacency matrix corresponding to the determined adjacency matrix of FIG. 4B, according to an example consistent with the principles of the present invention.

FIG. 4C illustrates a graph representing a symmetric adjacency matrix corresponding to the determined adjacency matrix of FIG. 4B, according to an example consistent with the principles of the present invention. In particular, the graph illustrated in FIG. 4C corresponds to a symmetric adjacency matrix $A_s$ resulting from performing 130 symmetrization of the method 100 on the determined adjacency matrix A of FIG. 4B. For example, the symmetrization may be performed 130 using equation (4) with the adjacency matrix A determined 110 from the example NoN, as described above. For the example NoN, the symmetric adjacency matrix $A_s$ may be more symmetric (i.e., closer to the actual adjacency matrix of the example NoN) than the determined adjacency matrix A, according to some examples.

Figure 5A:
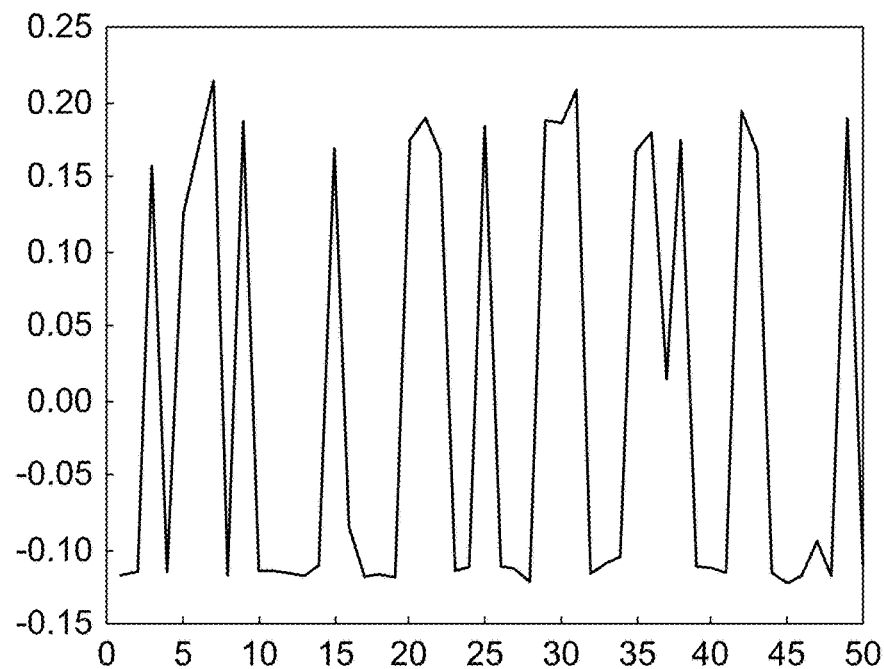
FIG. 5A illustrates a plot of a Fiedler vector, according to an example consistent with the principles of the present invention.
Figure 5B:
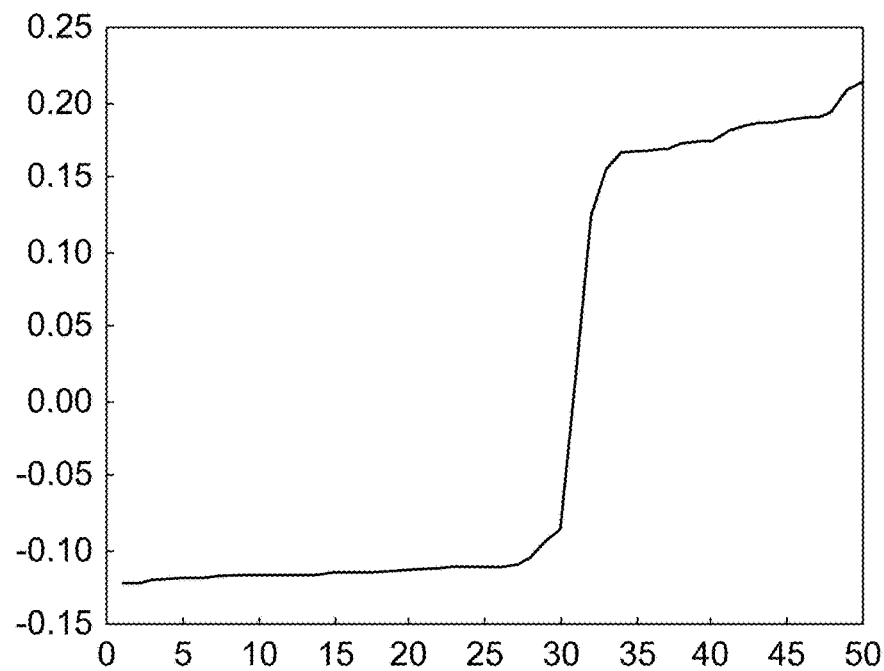
FIG. 5B illustrates a plot of the Fiedler vector of FIG. 5A with entries of the Fiedler vector arranged in ascending order, according to an example consistent with the principles of the present invention.

Partitioning 120 the graph of the determined adjacency matrix A of the method 100 of NoN structure reconstruction applied to the example NoN was also performed. FIG. 5A illustrates a plot of a Fiedler vector, according to an example consistent with the principles of the present invention. In particular, the Fiedler vector plotted in FIG. 5A was found 122 from a Laplacian matrix of the graph illustrated in FIG. 4C. FIG. 5B illustrates a plot of the Fiedler vector of FIG. 5A with entries of the Fiedler vector sorted 124 and arranged in ascending order, according to an example consistent with the principles of the present invention. The Fiedler vector illustrated in FIGS. 5A and 5B was then used to partition 120 the graph of FIG. 4C into two subgraphs (i.e., first and second subgroups) corresponding respectively to the assigned 126, 128 positive and negative valued entries of the Fiedler vector. The results of the partitioning 120 of the method 100 of NoN structure reconstruction are described below with respect to FIGS. 6A and 6B.

Figure 6A:
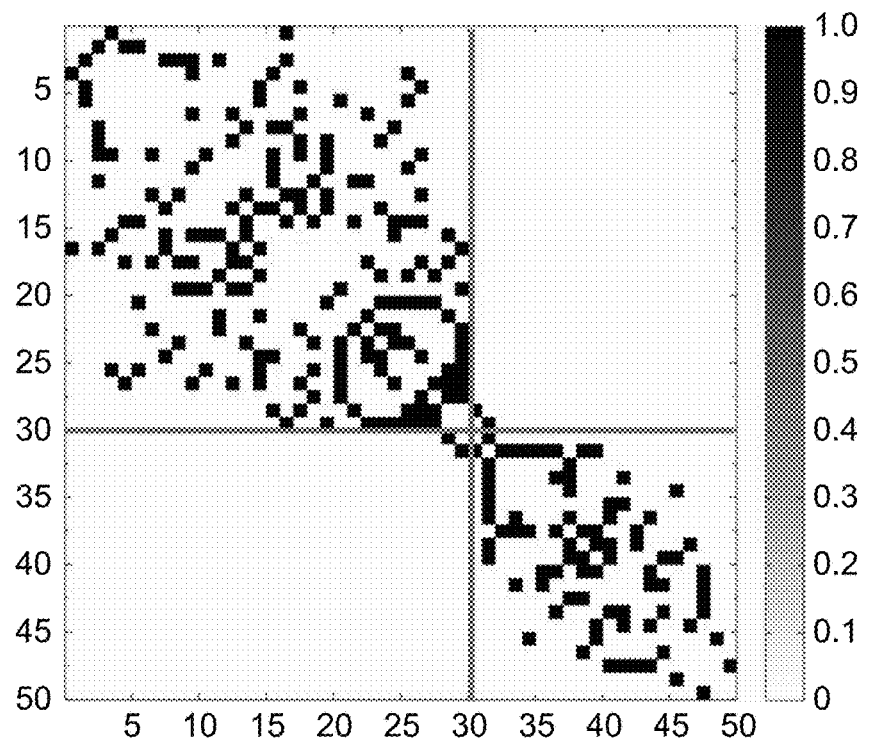
FIG. 6A illustrates a partitioned graph, according to an example consistent with the principles of the present invention.

FIG. 6A illustrates a partitioned graph, according to an example consistent with the principles of the present invention. In particular, FIG. 6A illustrates the graph of FIG. 4A in which the nodes have been rearranged to reveal subgraphs corresponding to the first network and the second network, respectively. The partitioned graph of FIG. 6A represents the true adjacency matrix of the example NoN.

Figure 6B:
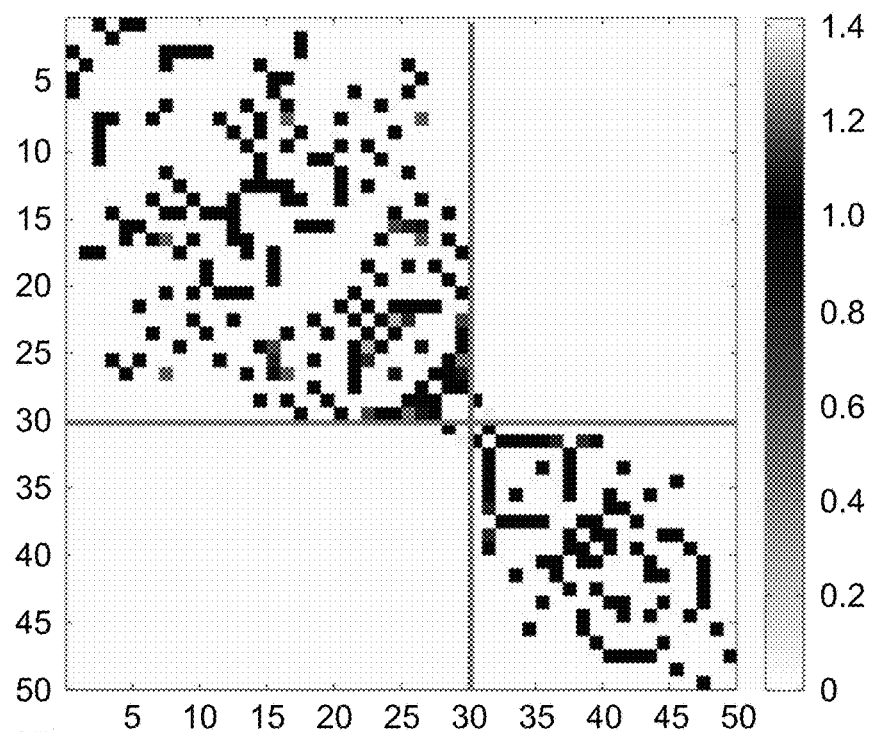
FIG. 6B illustrates a partitioned graph, according to another example consistent with the principles of the present invention.

FIG. 6B illustrates a partitioned graph, according to another example consistent with the principles of the present invention. In particular, FIG. 6B illustrates a result of partitioning 120 the graph of FIG. 4C produced from the example NoN using the Fiedler vector of FIGS. 5A and 5B. As such, the partitioned graph of FIG. 6B represents a reconstruction of the connection structure of the example NoN according to the method 100 of NoN structure reconstruction. Note that the partitioned graph of FIG. 6B was generated without using information regarding the connections within the example NoN. Further, while there are some minor differences in the partitioned graphs of FIGS. 6A and 6B, the partition is substantially identical between the two partitioned graphs, as illustrated.

Figure 7:
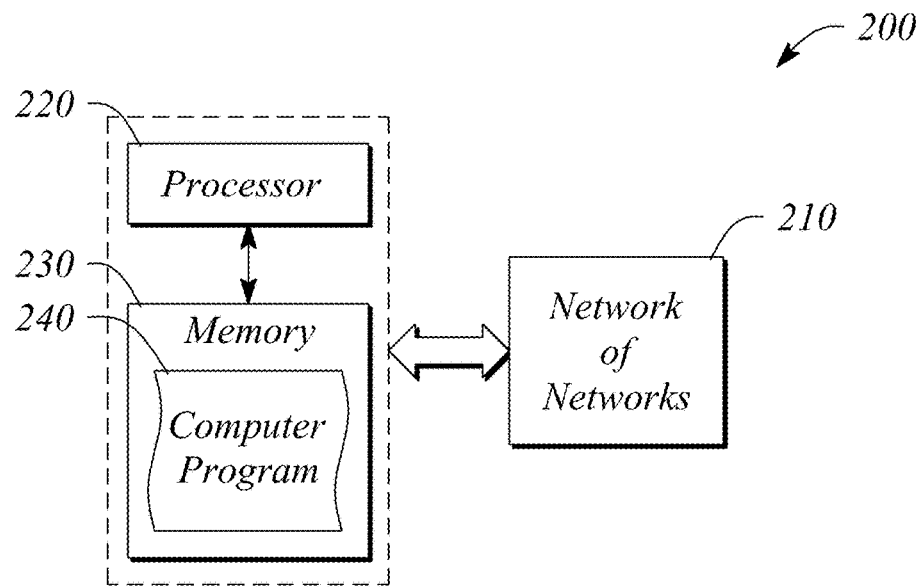
FIG. 7 illustrates a block diagram of a network connection reconstruction system, according to an example consistent with the principles of the present invention.

In some embodiments of the present invention, a network connection reconstruction system is provided. The network connection reconstruction system is configured to produce or reconstruct a connection structure between nodes of the network. Further, the network connection reconstruction system provides node-to-node connection reconstruction for a network of networks, according to various embodiments. FIG. 7 illustrates a block diagram of a network connection reconstruction system 200, according to an example consistent with the principles of the present invention.

As illustrated in FIG. 7, the network connection reconstruction system 200 comprises a network of networks (NoN) 210. According to some embodiments, the NoN 210 may be substantially similar to the NoN described above with respect to the method 100 of NoN structure reconstruction. In particular, the NoN may comprise a first network and a second network, according to various examples.

As illustrated, the network connection reconstruction system 200 further comprises a processor 220 and a memory 230. The processor 220 may be substantially any processor including, but not limited to, a microprocessor. The memory 230 may be substantially any memory including, but not limited to, random access memory (RAM), read only memory (ROM), or a combination thereof. The processor 220 and the memory 230 are discussed in more detail below with respect to FIG. 8.

The network connection reconstruction system 200 further comprises a computer program 240. The computer program 240 is stored in the memory 230. Further, the computer program 240 includes instructions that, when executed by the processor 220, provide reconstruction of a connection structure between nodes of the NoN 210. In particular, the instructions comprise instructions to determine an adjacency matrix of the NoN from multivariate time series data using compressed sensing and instructions to partition a graph representing the determined adjacency matrix into a first subgraph and a second subgraph. According to some embodiments, the connection structure reconstruction implemented by the instructions of the computer program 240 may substantially similar to the method 100 of NoN structure reconstruction, described above.

In particular, determination of an adjacency matrix provided by the instructions of the computer program 240 may be substantially similar to determining 110 an adjacency matrix A of an NoN from multivariate time series data using compressed sensing described above with respect to the method 100 of NoN structure reconstruction. For example, instructions to determine the adjacency matrix using compressive sensing may perform a minimization given by equation (3). The computer program instructions configured to determine an adjacency matrix of the NoN 210 may further include instructions to replace an i-th row of the determined adjacency matrix A with an i-th column of the determined adjacency matrix A when a residual resulting from compressed sensing associated with the i-th row is greater than a predetermined value, for example. In addition, the computer program instructions may also include instructions to produce a symmetric adjacency matrix by performing a symmetrization of the determined adjacency matrix, wherein the symmetric adjacency matrix is to replace the determined adjacency matrix prior to graph partitioning. The symmetrization of the determined matrix may be substantially similar to performing symmetrization 130 described above for some embodiments of the method 100 of NoN structure reconstruction.

Further, the graph partitioning provided by the instructions of the computer program 240 may be substantially similar to partitioning 120 a graph representing the determined adjacency matrix A, as described above with respect to the method 100 of NoN structure reconstruction. For example, the computer program instructions to partition a graph representing the determined adjacency matrix may comprise instructions to find a Fiedler vector of a Laplacian matrix of the graph, wherein the Fiedler vector is an eigenvector of the Laplacian matrix corresponding to a second smallest eigenvalue of the Laplacian matrix. In addition, the instructions to partition a graph may further include instructions to: sort entries of the second smallest eigenvector in either ascending order or descending order; assign entries having a positive value to a first subgroup representing a first subgraph of the graph; and assign entries having a negative value to a second subgroup representing a second subgraph of the graph. The first subgraph may provide a reconstructed connection structure between nodes of the NoN corresponding to the first network and the second subgraph may provide a reconstructed connection between nodes of the NoN corresponding to a second network of the NoN, according to some embodiments.

In some embodiments of the present invention, a non-transitory computer readable medium is provided. In particular, the non-transitory computer readable medium is encoded with instructions that, when executed by a processor, implement reconstruction of a connection structure between nodes of a network of networks (NoN). According to various embodiments, the implemented connection structure reconstruction comprises determining an adjacency matrix of the NoN from multivariate time series data using compressed sensing. The multivariate time series data used in the compressed sensing comprises data produced at nodes of the NoN, according to various embodiments. The implemented connection structure reconstruction further comprises partitioning a graph representing the determined adjacency matrix into subgraphs characterizing connections between nodes of networks of the NoN. The partitioned graph provides a reconstruction of edge connections between nodes of the NoN.

In some embodiments, the implemented connection structure reconstruction is substantially similar to the above-described method 100 of NoN structure reconstruction. In particular, in some embodiments, determining an adjacency matrix of the NoN may be substantially similar to determining 110 an adjacency matrix A of an NoN from multivariate time series data using compressed sensing, described above. For example, determining an adjacency matrix implemented by instructions of the non-transitory computer readable medium may employ compressed sensing comprising finding a row vector of the adjacency matrix corresponding to a node of the NoN by performing a minimization of a function of all of the row vector, a tuning parameter that is greater than zero, the multivariate time series data, and a dynamic matrix that relates the row vector to the multivariate time series data. Further, in some embodiments, partitioning a graph representing the determined adjacency matrix may be substantially similar to partitioning 120 a graph representing the determined adjacency matrix A, described above with respect the method 100 of NoN structure reconstruction.

According to various embodiments, the NoN operated on by the non-transitory computer readable medium may be substantially similar to any of the NoNs described above. In particular, the NoN may comprise a first network and a second network and the connections may be either undirected or directed connections that are a priori unknown. In some examples, the non-transitory computer readable medium may be substantially similar to the memory 230 described above with respect to the network connection reconstruction system 200. In particular, the instructions included in or encoded on the non-transitory computer readable medium may be substantially similar to the computer program 240 stored in the memory 230 of the network connection reconstruction system 200. For example, the network connection reconstruction system 200 may comprise the non-transitory computer readable medium, according to some embodiments.

Figure 8:
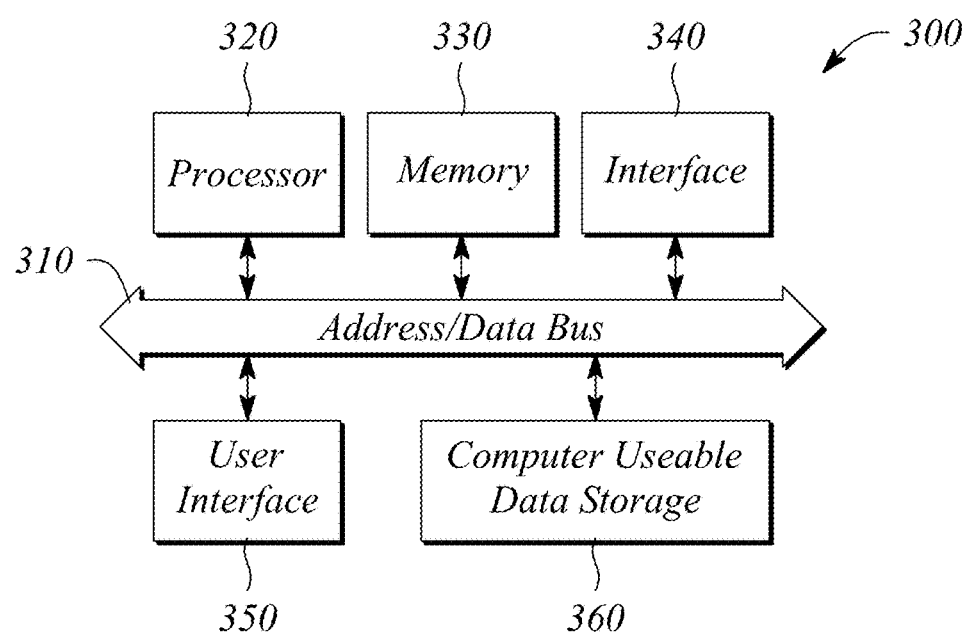
FIG. 8 illustrates a block diagram of a general-purpose computer, according to an embodiment consistent with the principles of the present invention.

FIG. 8 illustrates a block diagram of a general-purpose computer 300, according to an embodiment consistent with the principles of the present invention. The general-purpose computer 300 may be configured to implement (e.g., using a computer program) the method 100 of NoN structure reconstruction, according to various embodiments. The general-purpose computer 300 also may be configured to implement the network connection reconstruction system 200, in some embodiments. For example, a processor and memory of the general-purpose computer 300 described below may be used as the processor 220 and memory 230, respectively, of the network connection reconstruction system 200.

As illustrated in FIG. 8, the general-purpose computer 300 comprises an address/data bus 310. The address/data bus 310 is configured to communicate information between and among various constituent elements and modules of the general-purpose computer 300. The general-purpose computer 300 further comprises a processor 320. The processor 320 is coupled to the address/data bus 310 and is configured to process information and instructions (e.g., perform computations according to computer program instructions). In some embodiments, the processor 320 is a microprocessor. In other embodiments, the processor 320 may include, but is not limited to, a parallel processor, a virtual processor (e.g., cloud-based), an ASIC, an FPGA, or other hardware, as described above, for example.

According to various embodiments, the general-purpose computer 300 further comprises a memory 330. In particular, the memory 330 may be implemented as one or more data storage units coupled to the address/data bus 310. The memory 330 is configured to store information and instructions for use by the processor 320, for example. According to various embodiments, the memory 330, and more particularly the data storage units of the memory 330, may include, but are not limited to, random access memory (RAM), static RAM (SRAM), dynamic RAM (DRAM), or a combination thereof, that is coupled to the address/data bus 310. In some embodiments, the memory 330 includes or further includes substantially non-volatile memory such as, but not limited to, read-only memory (ROM), erasable programmable ROM (EPROM), electrically erasable programmable ROM (EEPROM), and flash memory. The substantially non-volatile memory may be coupled to the address/data buss 310 to provide non-volatile storage of information and instructions to be used by the processor 320, for example.

According to some embodiments, the processor 320 may be configured to one or both of execute instructions (e.g., a computer program) and employ data stored in a remote or online data storage unit such as in so-called 'cloud' computing. In these embodiments, the memory 330 may comprise the online data storage unit. According to some embodiments, the memory 330 may comprise a non-transitory computer readable medium and may include or be encoded with instructions (e.g., computer program instructions) that, when executed by the processor 320, implement network of networks (NoN) structure reconstruction.

In some embodiments, the general-purpose computer 300 may further comprise an interface 340, as illustrated in FIG. 8. The interface 340 may be coupled to the address/data bus 310, for example. According to various embodiments, the interface 340 is configured to interface or communicate with other electronic devices and computer systems. According to various embodiments, the interface 340 may include various communications technology such as wired or wireline interfaces (e.g., serial cables, modems, network adapters, etc.) and wireless interfaces (e.g., WiFi and other wireless modems, wireless network adapters, etc.).

In some embodiments, the general-purpose computer 300 may further comprise a user interface 350 coupled to the address/data bus 310. The user interface 350 may include, but is not limited to, an input device (e.g., keyboard, mouse, track-pad, touch screen, etc.) configured to communicate information and commands from a user to the processor 320 and a display device configured to communicate information from the processor 320 to a user. According to various examples, the display device may include, but is not limited to, a cathode ray tube (CRT), a liquid crystal display (LCD), a field emission display (FED), a plasma display, and substantially any other display device suitable for displaying information (e.g., video, alphanumeric data, etc.) to a user.

In some embodiments, the general-purpose computer 300 may further comprise computer useable data storage 360. According to some embodiments, the computer useable data storage 360 is coupled to the address/data bus 310 and is configured to store information including, but not limited to, computer executable instructions (e.g., a computer program). For example, the computer useable data storage 360 may comprise a non-transitory computer readable medium and may store or be encoded with instructions (e.g., stored computer program instructions) that, when executed by the processor 320, implement connection structure reconstruction in an NoN. According to various embodiments, the computer useable data storage 360 may include, but is not limited to, a magnetic or optical disk drive, e.g., a hard disk drive (HDD), a floppy disk drive (FDD), a compact disc read-only memory (CD-ROM), a digital versatile disk (DVD), a thumb drive, etc. In some embodiments, the computer useable data storage 360 may include or further include, network attached storage, cloud storage, etc.

The general-purpose computer 300 described herein is an example of a computing environment that may be employed to implement embodiments of the present invention. However, implementation is not restricted to using a general-purpose computer 300, as illustrated in FIG. 8. For example, other computing systems and computing environments including, but not limited to, a virtual computing environment and various specialized processing systems may be employed. Further, according to some embodiments, one or more operations of various embodiments of the present invention may be controlled or implemented using computer-executable instructions, such as computer program modules, which are executed by a computer including, but not limited to, the general-purpose computer 300. According to some embodiments, such computer program modules may include routines, programs, object components and data structures configured to perform particular tasks or implement particular abstract data types, for example. In addition, some embodiments provide that one or more aspects of the present invention may be implemented by utilizing a distributed computing environment, such as where tasks are performed by remote processing devices that are linked through a communications network, or such as where various program modules are located in both local and remote computer-storage media including memory-storage devices, for example.

Thus, there have been described examples of a method of network of networks structure reconstruction, a network connection reconstruction system, and a non-transitory computer readable medium, each of which one or both of stores instructions and implements reconstruction of a connection structure between nodes of a network of networks using compressed sensing with multivariate time series data and graph partitioning. It should be understood that the above-described examples are merely illustrative of some of the many specific examples and embodiments that represent the principles consistent with the principles described herein. Clearly, those skilled in the art can readily devise numerous other arrangements without departing from the scope consistent with the principles described herein as defined by the following claims.

What is claimed is:

1. A method of network of networks (NoN) structure reconstruction, the method comprising:
   determining an adjacency matrix A of an NoN from multivariate time series data using compressed sensing, the multivariate time series data comprising data produced at nodes of the NoN; and
   partitioning a graph representing the determined adjacency matrix A into subgraphs, the subgraphs characterizing node-to-node connections within and between a plurality of networks of the NoN,
   wherein the subgraphs of the partitioned graph provide a reconstruction of a node-to-node connection structure of the NoN.

2. The method of NoN structure reconstruction of claim 1, wherein partitioning a graph minimizes a ratio of cuts relative to a product of sizes of the subgraphs.

3. The method of NoN reconstruction of claim 1, wherein the determined adjacency matrix A is an N×N matrix having N rows and N columns, and wherein determining the adjacency matrix A of the NoN using compressed sensing comprises finding an i-th row vector $\alpha_i$ of the adjacency matrix A corresponding to an i-th node of the NoN by performing a minimization given by $$\min_{\alpha_i}\left(\|y_i - D_i a_i^T\|_2^2 + \lambda\|a_i^T\|_1\right)$$

where i is an integer index ranging from 1 to N, $\lambda$ is a tuning parameter that has a predetermined scalar value greater than one, $y_i$ is a vector that represents multivariate time series data for the i-th node, $D_i$ is a dynamics matrix relating the multivariate time series data $y_i$ to the i-th row vector $\alpha_i$, $(\bullet)^T$ is a transpose operator, and where $\|\bullet\|_1$ and $\|\bullet\|_2$ are a 1-norm and a 2-norm, respectively.

4. The method of NoN structure reconstruction of claim 3, wherein determining the adjacency matrix A of the NoN further comprises replacing an i-th row of the determined adjacency matrix A with an i-th column of the determined adjacency matrix A when a residual of the performed minimization is greater than a predetermined value.

5. The method of NoN structure reconstruction of claim 1, wherein partitioning a graph representing the determined adjacency matrix A comprises finding a Fiedler vector of a Laplacian matrix of the graph, the Fiedler vector being an eigenvector of the Laplacian matrix corresponding to a second smallest eigenvalue of the Laplacian matrix.

6. The method of NoN structure reconstruction of claim 5, wherein partitioning a graph representing the determined adjacency matrix A further comprises:
   sorting entries in the Fiedler vector into either ascending order or descending order;
   assigning entries having a positive value to a first subgroup representing a first subgraph of the graph; and
   assigning entries having a negative value to a second subgroup representing a second subgraph of the graph,
   wherein the first subgraph provides a reconstructed connection structure between nodes of the NoN corresponding to a first network of the NoN and the second subgraph provides a reconstructed connection structure between nodes of the NoN corresponding to a second network of the NoN.

7. The method of NoN structure reconstruction of claim 1, further comprising performing a symmetrization of the determined adjacency matrix A to produce a symmetric adjacency matrix $A_s$, the symmetric adjacency matrix $A_s$ replacing the determined adjacency matrix A prior to graph partitioning.

8. The method of NoN reconstruction of claim 7, wherein performing symmetrization comprises computing the symmetric adjacency matrix $A_s$ according to $$A_s = \frac{A + A^T}{2}$$

where $A^T$ is a matrix transpose of the determined adjacency matrix A.

9. The method of NoN structure reconstruction of claim 1, further comprising measuring the multivariate time series data at nodes of the NoN.

10. A non-transitory computer readable medium including instructions that, when executed by a processor, implement a reconstruction of connection structure between nodes of the NoN according to the method of NoN structure reconstruction of claim 1.

11. A network connection reconstruction system comprising:
   a network of networks (NoN) that comprises a first network and a second network;
   a processor;
   a memory; and
   a computer program stored in the memory, the computer program including instructions that, when executed by the processor, provide reconstruction of a connection structure between nodes of the NoN by determining an adjacency matrix of the NoN from multivariate time series data using compressed sensing and by partitioning a graph representing the determined adjacency matrix into a first subgraph and a second subgraph, wherein the multivariate time series data is measured at the nodes of the NoN, and wherein the first and second subgraphs of the partitioned graph provide a reconstruction of node-to-node connections within the NoN.

12. The network connection reconstruction system of claim 11, wherein connections within the NoN are undirected connections.

13. The network connection reconstruction system of claim 11, wherein instructions to determine the adjacency matrix using compressive sensing are to perform a minimization given by $$\min_{a_i}(\|y_i - D_i a_i\|_2^2 + \lambda \|a_i\|_1)$$

where $\alpha_i$ is an i-th row vector of the adjacency matrix corresponding to an i-th node of the NoN, $\lambda$ is a predetermined tuning parameter that is greater than one, $y_i$ is a vector that represents multivariate time series data for the i-th node, $D_i$ is a dynamics matrix relating the multivariate time series data $y_i$ to the i-th row vector $\alpha_i$, and where $\|\cdot\|_1$ and $\|\cdot\|_2$ are a 1-norm and a 2-norm, respectively.

14. The network connection reconstruction system of claim 11, wherein the computer program further comprises instructions to replace an i-th row of the determined adjacency matrix A with an i-th column of the determined adjacency matrix A when a residual resulting from compressed sensing associated with the i-th row is greater than a predetermined value.

15. The network connection reconstruction system of claim 11, wherein instructions to partition a graph representing the determined adjacency matrix comprise instructions to find a Fiedler vector of a Laplacian matrix of the graph, wherein the Fiedler vector is an eigenvector of the Laplacian matrix corresponding to a second smallest eigenvalue of the Laplacian matrix.

16. The network connection reconstruction system of claim 15, wherein the instructions to partition a graph further comprise instructions to:
  sort entries of the second smallest eigenvector in ascending order;
  assign entries having a positive value to a first subgroup representing a first subgraph of the graph; and
  assign entries having a negative value to a second subgroup representing a second subgraph of the graph, wherein the first subgraph provides a reconstructed connection structure between nodes of the NoN corresponding to the first network and the second subgraph provides a reconstructed connection between nodes of the NoN corresponding to a second network of the NoN.

17. The network connection reconstruction system of claim 11, wherein the computer program further comprises instructions to produce a symmetric adjacency matrix by performing a symmetrization of the determined adjacency matrix, wherein the symmetric adjacency matrix is to replace the determined adjacency matrix prior to graph partitioning.

18. A non-transitory computer readable medium including instructions that, when executed by a processor, implement reconstruction of a connection structure between nodes of a network of networks (NoN), the implemented connection structure reconstruction comprising:
  determining an adjacency matrix of the NoN from multivariate time series data using compressed sensing, the multivariate time series data comprising data produced at nodes of the NoN; and
  partitioning a graph representing the determined adjacency matrix into subgraphs characterizing connections between nodes of networks of the NoN,
  wherein the partitioned graph provides a reconstruction of edge connections between nodes of the NoN.

19. The non-transitory computer readable medium of claim 18, wherein compressed sensing comprises finding a row vector of the adjacency matrix corresponding to a node of the NoN by performing a minimization of a function of the row vector, a tuning parameter that is greater than zero, the multivariate time series data, and a dynamic matrix that relates the row vector to the multivariate time series data.

20. A network connection reconstruction system comprising the non-transitory computer readable medium of claim 18, the network connection reconstruction system further comprising:
  a processor to execute the instructions encoded on the non-transitory computer readable medium; and
  the NoN, wherein the NoN comprises a first network and a second network, connections between nodes within each of the first network and the second network and connections between the first and second networks being undirected connections.

* * * * *